(12) United States Patent
Kim et al.

(10) Patent No.: US 7,968,234 B2
(45) Date of Patent: Jun. 28, 2011

(54) NON-AQUEOUS ELECTROLYTE AND LITHIUM SECONDARY BATTERY COMPRISING SAME

(75) Inventors: Jin-Hee Kim, Seoul (KR); Jin-Sung Kim, Cheonan-si (KR); Sang-Moon Hwang, Cheonan-si (KR); Meen-Seon Paik, Cheonan-si (KR); Hak-Soo Kim, Kumi-si (KR)

(73) Assignees: Samsung SDI Co., Ltd., Yongin-si (KR); Cheil Industries Inc., Kumi-si (KR)

( * ) Notice: Subject to any disclaimer, the term of this patent is extended or adjusted under 35 U.S.C. 154(b) by 0 days.

(21) Appl. No.: 12/782,511

(22) Filed: May 18, 2010

(65) Prior Publication Data
US 2010/0227219 A1 Sep. 9, 2010

Related U.S. Application Data

(62) Division of application No. 10/817,761, filed on Apr. 2, 2004, now Pat. No. 7,745,054.

(30) Foreign Application Priority Data

Apr. 3, 2003 (KR) .................. 10-2003-0021110

(51) Int. Cl.
*H01M 6/18* (2006.01)
(52) U.S. Cl. ............... 429/307; 429/218.1; 429/231.95; 429/231.1
(58) Field of Classification Search ................ 429/307, 429/218.1, 231.95, 231.1
See application file for complete search history.

(56) References Cited

U.S. PATENT DOCUMENTS

| | | | |
|---|---|---|---|
| 4,489,145 | A | 12/1984 | Abraham et al. |
| 4,943,497 | A | 7/1990 | Oishi et al. |
| 5,879,834 | A | 3/1999 | Mao |
| 6,074,777 | A | 6/2000 | Reimers et al. |
| 6,942,949 | B2 | 9/2005 | Besenhard et al. |
| 7,223,500 | B2 | 5/2007 | Noh et al. |
| 7,294,436 | B2 | 11/2007 | Abe et al. |

(Continued)

FOREIGN PATENT DOCUMENTS

CN 1334614 2/2002

(Continued)

OTHER PUBLICATIONS

Patent Abstracts of Japan, Publication No. 2004-134261;dated Apr. 30, 2004; in the name of Toru Matsui et al.

(Continued)

*Primary Examiner* — Laura S Weiner
(74) *Attorney, Agent, or Firm* — Christie, Parker & Hale, LLP (57) ABSTRACT

An electrolyte for a lithium secondary battery includes lithium salts, a non-aqueous organic solvent, and additive compounds, which initiates decomposition at 4V to 5V and show a constant current maintenance plateau region of more than or equal to 0.5V at measurement of LSV (linear sweep voltammetry). The additive compounds added to the electrolyte of the present invention decompose earlier than the organic solvent to form a conductive polymer layer on the surface of a positive electrode by increased electrochemical energy and heat at overcharge. The conductive polymer layer prevents decomposition of the organic solvent. Accordingly, the electrolyte inhibits gas generation caused by decomposition of the organic solvent during high temperature storage, and also improves safety of the battery during overcharge.

3 Claims, 4 Drawing Sheets

U.S. PATENT DOCUMENTS

| | | | |
|---|---|---|---|
| 7,316,868 B2 * | 1/2008 | Gorkovenko | 429/218.1 |
| 2001/0024757 A1 | 9/2001 | Hwang et al. | |
| 2002/0034691 A1 | 3/2002 | Segawa | |
| 2002/0045102 A1 | 4/2002 | Jung et al. | |
| 2003/0118912 A1 | 6/2003 | Watanabe et al. | |
| 2003/0157411 A1 | 8/2003 | Jung et al. | |

FOREIGN PATENT DOCUMENTS

| | | |
|---|---|---|
| CN | 1336696 | 2/2002 |
| CN | 1419309 | 5/2003 |
| CN | 1430306 | 7/2003 |
| JP | 61-230276 | 10/1986 |
| JP | 1-206571 | 8/1989 |
| JP | 6-333596 | 12/1994 |
| JP | 6-338347 | 12/1994 |
| JP | 7-302614 | 11/1995 |
| JP | 7-320779 | 12/1995 |
| JP | 8-64238 | 3/1996 |
| JP | 8-321312 | 12/1996 |
| JP | 9-50822 | 2/1997 |
| JP | 9-73918 | 3/1997 |
| JP | 9-106835 | 4/1997 |
| JP | 9-171840 | 6/1997 |
| JP | 10-50342 | 2/1998 |
| JP | 10-321258 | 12/1998 |
| JP | 11-162512 | 6/1999 |
| JP | 2939469 | 6/1999 |
| JP | 2000-58117 | 2/2000 |
| JP | 2001-126761 | 5/2001 |
| JP | 2002-075446 | 3/2002 |
| JP | 2004-134261 | 4/2004 |
| KR | 10-0328235 | 2/2001 |
| KR | 2003-0051609 | 6/2003 |
| KR | 2003-0061218 | 7/2003 |
| KR | 2003-0061219 | 7/2003 |
| WO | WO 02/059999 A1 | 8/2002 |

OTHER PUBLICATIONS

Korean Patent Abstracts, Publication No. 10-0328235; dated Feb. 26, 2001, in the name of Kazuya Iwamoto et al.

Korean Patent Abstracts, Publication No. 1020030061218, dated Jul. 18, 2003, in the name of Sang Hun Choi et al.

Korean Patent Abstracts, Publication No. 1020030061219, dated Jul. 18, 2003, in the name of Sang Hun Choi et al.

Megahed, et al., "Lithium-ion rechargeable batteries" J. Power Sources, 51(1994) pp. 79-104.

Yang, et al., "Composition analysis of the passive film on the carbon electrode of a lithium-ion battery with an EC-based electrolyte" Journal of Power Sources 72 (1998) pp. 66-70.

Patent Abstract of Japan 06-333596, Published Dec. 2, 1994, in the name of Yamazaki, et al.

Patent Abstract of Japan 07-320779, Published Dec. 8, 1995, in the name of Yamazaki, et al.

Patent Abstract of Japan 08-064238, Published Mar. 8, 1996, in the name of Uehara, et al.

Patent Abstract of Japan 08-321312, Published Dec. 3, 1996, in the name of Jinno, et al.

Patent Abstract of Japan 09-073918, Published Mar. 18, 1997, in the name of Ogawa, et al.

European Search Report dated Dec. 4, 2006, for 04090417.9, in the name of Samsung SDI Co., Ltd.

Matsuda, Y., et al., *Organic Additives for the Electrolytes of Rechargeable Lithium Batteries*, Journal of Power Sources, vol. 26, 1989, pp. 579-583.

Patent Abstract of Japan, Publication No. 01-206571, dated Aug. 18, 1989, in the name of Kuzhikalail M. Abraham, et al.

Patent Abstract of Japan, Publication No. 06-338347, dated Dec. 6, 1994, in the name of Momoe Saitou, et al.

Patent Abstract of Japan, Publication No. 07-302614, dated Nov. 14, 1995, in the name of Ryuichi Shimizu, et al.

Patent Abstract of Japan, Publication No. 09-050822, dated Feb. 18, 1997, in the name of Ryuichi Shimizu.

Patent Abstract of Japan, Publication No. 09-106835, dated Apr. 22, 1997, in the name of Huanyu Mao.

Patent Abstract of Japan, Publication No. 09-171840, dated Jun. 30, 1997, in the name of Huanyu Mao, et al.

Patent Abstract of Japan, Publication No. 10-050342, dated Feb. 20, 1998, in the name of Takayuki Yamahira.

Patent Abstract of Japan, Publication No. 10-321258, dated Dec. 4, 1998, in the name of Huanyu Mao, et al.

Patent Abstract of Japan, Publication No. 2000-058116, dated Feb. 25, 2000, in the name of Masatoshi Takahashi, Corresponds to JP Unexamined 2939469, Published Jun. 11, 1999.

Patent Abstract of Japan, Publication No. 11-162512, dated Jun. 18, 1999, in the name of Jan Naess Reimers, et al.

Patent Abstract of Japan, Publication No. 2000-058117, dated Feb. 25, 2000, in the name of Masatoshi Takahashi, et al.

Patent Abstracts of Japan, Publication No. 2001-126761; dated May 11, 2001, in the name of Minoru Kotado et al.

Notice of Allowance dated Feb. 16, 2010 in U.S. Appl. No. 10/817,761, listing the cited reference in this IDS.

* cited by examiner

NON-AQUEOUS ELECTROLYTE AND LITHIUM SECONDARY BATTERY COMPRISING SAME

CROSS REFERENCE TO RELATED APPLICATION

This application is a divisional of U.S. patent application Ser. No. 10/817,761, filed Apr. 2, 2004, now U.S. Pat. No. 7,745,054, which claims priority of and is based on Korean patent application No. 10-2003-0021110 filed in the Korean Intellectual Property Office on Apr. 3, 2003, the entire disclosure of which is incorporated herein by reference.

FIELD OF THE INVENTION

The present invention relates to a non-aqueous electrolyte and a lithium secondary battery comprising the same, and more particularly, to a non-aqueous electrolyte for a lithium secondary battery capable of preventing the thickness of the battery from expanding when the battery is stored at a high temperature, thereby improving the safety of the battery at overcharge, and a lithium secondary battery comprising the same.

BACKGROUND OF THE INVENTION

The use of portable electronic instruments is increasing as electronic equipment gets smaller and lighter due to developments in the high-tech electronic industries. Studies on lithium secondary batteries are actively being pursued in accordance with the increased need for batteries having high energy density for use as the power sources in these portable electronic instruments. Materials that are capable of reversible intercalation/deintercalation of lithium ions such as lithium-transition metal oxides are used as a positive active material of a lithium secondary battery, and lithium metals, lithium-containing alloys, or materials that are capable of reversible intercalation/deintercalation of lithium ions such as crystalline or amorphous carbons, or carbon-containing composites, are used as a negative active material of a lithium secondary battery.

Figure 1:
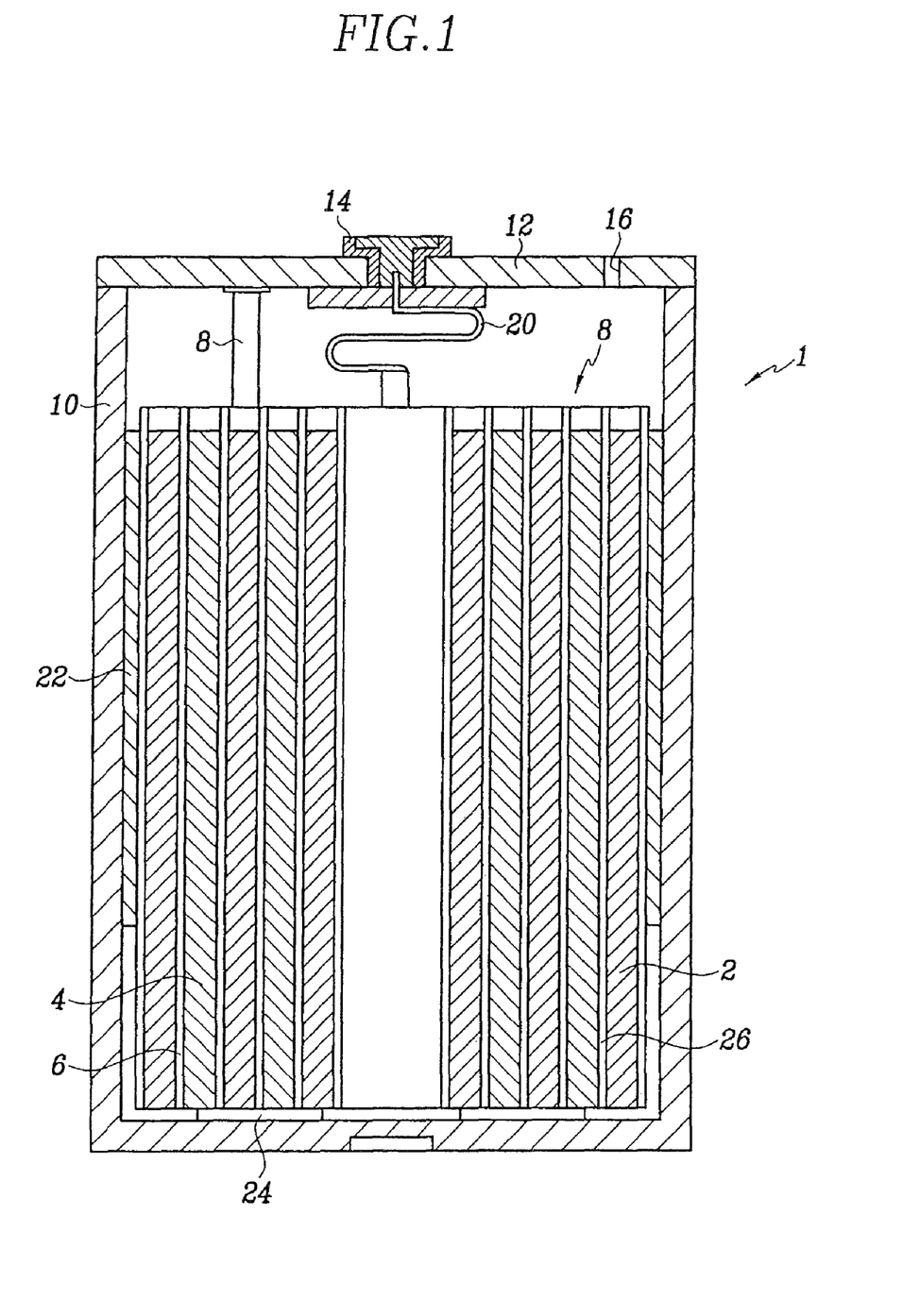
FIG. 1 is a cross-sectional view of a prismatic lithium secondary battery cell.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached to the positive electrode 2 and negative electrode 4. Insulators 22 and 24 are installed on the lower part and the side part of the electrode assembly 8 to prevent a short circuit occurrence in the battery.

The average discharge voltage of a lithium secondary battery is about 3.6 to 3.7V, which is higher than other alkali batteries, Ni-MH batteries, Ni—Cd batteries, etc. An electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, diethyl carbonate, etc., is often used as an electrolyte. However, such an electrolyte has significantly lower ion conductivity than an aqueous electrolyte that is used in a Ni-MH battery or a Ni—Cd battery, thereby resulting in the deterioration of battery characteristics during charging and discharging at high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as an organic solid electrolyte interface (SEI) film. The organic SEI film formed during the initial charge not only prevents reaction between lithium ions and the carbon negative electrode or other materials during charging and discharging, but it also acts as an ion tunnel, allowing the passage of only lithium ions. The ion tunnel prevents the disintegration of the structure of the carbon negative electrode, which causes organic solvents in an electrolyte with a high molecular weight to solvate lithium ions, and the solvent and the solvated lithium ions co-intercalate into the carbon negative electrode.

Once the organic SEI film is formed, lithium ions do not react any further with the carbon electrode or other materials such that the amount of lithium ions is maintained. That is, the carbon of the negative electrode reacts with the electrolyte during the initial charging, thus forming a passivation layer such as an organic SEI film on the surface of the negative electrode such that the electrolyte solution no longer decomposes, and stable charging and discharging are maintained (*J. Power Sources*, 51 (1994), 79-104). For these reasons, in a lithium secondary battery, there is no irreversible formation reaction of the passivation layer, and a stable cycle life after the initial charging reaction is maintained.

For a thin prismatic battery, gases are generated inside the battery due to decomposition of a carbonate based organic solvent during the organic SEI film-forming reaction (*J. Power Sources*, 72 (1998), 66-70). These gases include $H_2$, CO, $CO_2$, $CH_4$, $C_2H_6$, $C_3H_8$, $C_3H_6$, etc. depending on the type of non-aqueous organic solvent and negative active material used. The thickness of the battery increases during charging due to the generation of gas inside the battery, and the passivation layer slowly disintegrates by electrochemical energy and heat energy, which increase with the passage of time when the battery is stored at high temperatures after it is charged. Accordingly, a side reaction in which an exposed surface of the negative electrode reacts with surrounding electrolyte occurs continuously.

The above problems occur in a positive electrode. At initial charging, positive active material reacts with electrolyte to form a passivation layer on the positive electrode, and the passivation layer prevents decomposition of electrolyte resulting in maintenance of stable charge-discharge. For the negative electrode, the charge consumed during formation of the passivation layer on the positive electrode is irreversible. For this reason, in a lithium ion battery, there is no irreversible formation reaction of the passivation layer, and a stable cycle life after the initial charging reaction is maintained.

However, as mentioned previously, the passivation layer slowly disintegrates by electrochemical energy and heat energy, which increase with the passage of time when the fully charged battery is stored at high temperatures after it is charged. For example, if a battery is stored at 85° C. for four days after a 100% charge at 4.2 V, an exposed surface of the positive electrode reacts with surrounding electrolyte to generate gases. The generated gases include CO, $CO_2$, $CH_4$, $C_2H_6$, etc. from decomposition of a carbonate-based solvent.

The internal pressure of the battery increases with this generation of gases in both positive and negative electrodes.

The increase in the internal pressure induces the deformation of prismatic and lithium polymer batteries. As a result, regional differences in the cohesion among electrodes inside the electrode assembly (positive and negative electrodes, and separator) of the battery occur, thereby deteriorating the performance and safety of the battery and making it difficult to mount the lithium secondary battery set into electronic equipment.

Further, disintegration of the passivation layer due to an increase of electric or thermal energy results in a continuous side reaction between positive and negative electrodes and the electrolyte. Gases generated from the side reaction increase internal pressure inside battery causing deformation of the battery to induce a short or thermal runaway.

As one method for solving the internal pressure problem, there is disclosed a method in which the safety of a secondary battery including a non-aqueous electrolyte is improved by mounting a vent or a current breaker for ejecting internal electrolyte solution when the internal pressure is increased above a certain level. However, a problem with this method is that mis-operation may result from an increase in internal pressure itself.

Furthermore, a method in which the SEI-forming reaction is changed by injecting additives into an electrolyte so as to inhibit the increase in internal pressure is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved using 1 to 20% of an N-butyl amine based compound in an electrolyte. Japanese Patent Laid-open No. 96-64238 discloses a method in which storage characteristics of a battery are improved by adding $3 \times 10^{-4}$ to $3 \times 10^{-2}$ M of calcium salt to the electrolyte. Japanese Patent Laid-open No. 94-333596 discloses a method in which storage characteristics of a battery are improved by adding an azo-based compound to inhibit the reaction between an electrolyte and the negative electrode of the battery. In addition, Japanese Patent Laid-open No. 95-320779 discloses a method in which $CO_2$ is added to an electrolyte, and Japanese Patent Laid-open No. 95-320779 discloses a method in which sulfide-based compounds are added to an electrolyte in order to prevent the electrolyte from decomposing.

Such methods as described above for inducing the formation of an appropriate film on a negative electrode surface such as an organic SEI film by adding a small amount of organic or inorganic materials are used in order to improve the storage characteristics and safety of a battery. However, there are various problems with these methods: the added compound often decomposes or forms an unstable film by interacting with the carbon negative electrode during the initial charge and discharge due to inherent electrochemical characteristics, resulting in the deterioration of the ion mobility in electrons; and gas is generated inside the battery such that there is an increase in internal pressure, resulting in significant deterioration of the storage, safety, cycle life, and capacity characteristics of the battery.

SUMMARY OF THE INVENTION

In one embodiment of the present invention a non-aqueous electrolyte is provided for a lithium secondary battery including an organic compound that is capable of inhibiting the generation of gas inside the battery when the battery is stored at a high temperature.

In another embodiment of the present invention, a non-aqueous electrolyte is provided for a lithium secondary battery that is capable of improving safety by inhibiting overcharge.

In yet another embodiment of the present invention, a lithium secondary battery having good storage characteristics and good safety is provided.

In order to accomplish the aspects of the present invention, in one embodiment of the present invention an electrolyte is provided for a lithium secondary battery comprising a lithium salt; a non-aqueous organic solvent; and an additive compound which initiates a decomposition at 4V to 5V and shows a constant current maintenance plateau region of more than or equal to 0.5V at measurement of LSV (linear sweep voltammetry).

The present invention also provides a lithium secondary battery comprising the electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Reference will now be made in detail to presently preferred embodiments of the invention, examples of which are illustrated in the accompanying drawings, wherein like reference numerals refer to like elements throughout. The embodiments are described below in order to explain the present invention by referring to the figures.

In the following detailed description, only selected embodiments of the invention have been shown and described, simply by way of illustration of the best mode contemplated by the inventors of carrying out the invention. As will be realized, the invention may be modified in various respects, all without departing from the invention. Accordingly, the drawings and description are to be regarded as illustrative in nature, and not restrictive.

An electrolyte of the present invention which is prepared by adding an additive compound to a non-aqueous solvent including lithium salts, initiates decomposition at 4V to 5V, preferably 4.5V to 5V, and shows a constant current maintenance plateau region of at least 0.5V at measurement of LSV (linear sweep voltammetry). In the present invention, the term "constant current maintenance" means that constant current is not significantly varied and is maintained within the range of $\pm 0.001 A/cm^2$, and more preferably, within the range of $\pm 0.005 A/cm^2$. Furthermore, the decomposition of the conventional non-aqueous solvent starts at about 5.7V and proceeds at about 7V so that the current is abruptly raised by 7V. Whereas the electrolyte of the present invention shows a constant current maintenance between 6.5 and 7.0V and it shows that the decomposition of the electrolyte of the present invention represses.

The electrolyte of the present invention has a decomposition initiating voltage from 4.5V to 7V, preferably from 5.5V to 6.5V, and more preferably from 6V to 6.5V.

LSV is measured in the voltage range of 3V to 7V at a scan rate of 1 to 5 mV/s, and preferably 5 mV/s. In the preferred embodiment, a Pt electrode is used as a working electrode and lithium metal is used as a reference electrode and counter electrode.

Conventionally, in order to prevent gas generation, and thereby prevent an increase of internal pressure, an SEI layer has been used to prevent side reactions between the negative electrode and the electrolyte.

At high temperature, decomposition of the electrolyte at the surface of the positive electrode actively occurs, causing an increase of internal pressure for the battery. According to the present invention, an additive compound is used to form a passivation layer on the surface of the positive electrode to prevent oxidative decomposition of the electrolyte.

A carbonate-based solvent starts to decompose at about 5.7V and generate gas inside the battery. The additive compounds of the present invention decompose earlier than an electrolytic organic solvent during overcharge at a voltage of 4 to 5V, particularly 4.5 to 5V. the use of such additives results in the formation of a passivation layer on the surface of the positive electrode, thus inhibiting the decomposition of the electrolytic organic solvent. Swelling of the battery is prevented during high temperature storage after full charging, since the generation of gas caused by the decomposition of the electrolytic organic solvent is inhibited during initial charging. In addition, there is no deterioration of low temperature and storage characteristics or charge and discharge capacity of the lithium secondary battery. Preventing swelling during storage at high temperature after fully charging improves the reliability of batteries after mounting a battery set.

The additive compound shows constant current maintenance at a voltage of 6.5V or higher. This contributes to the safety of a battery by consuming current at overcharge. The additive compounds of the present invention start to decompose when the battery voltage approaches an overcharge voltage, and polymerize electrochemically, resulting in the formation of a conductive polymer layer on a surface of the positive electrode. The conductive polymer layer effectively acts as a resister and overcharge inhibitor since the layer is difficult to redissolve. The additive compounds also reduce exothermic heat, preventing thermal runaway and improving safety.

Currently used positive active materials include lithium-cobalt-based oxide, lithium-manganese-based oxide, lithium-nickel-based oxide, lithium-nickel-manganese-based oxide, and the like. A lithium-nickel-based or lithium-nickel-manganese-based oxide is inexpensive and provides a high discharge capacity, but tends to generate gas during high-temperature storage. Recent research has attempted to solve this problem by developing a modified negative active material. The additive-containing electrolyte of the present invention solves the above problem even when a conventional lithium-nickel-based or lithium-nickel-manganese-based oxide is used as a positive active material, and a conventional carbonaceous material is used as a negative active material.

The electrolyte including the additive compound shows exothermic peaks at less than or equal to about 100° C., preferably at less than or equal to 90° C., more preferably at less than or equal to 80° C., even more preferably at less than or equal to 70° C., at overcharge of more than 12V.

Examples of the additive compounds include bisphenol A, 2,5-dimethylfuran, and 2,3-dichloro-1,4-naphthoquinone.

The additive compounds are added in an amount from 0.01 to 10 wt %, preferably from 0.01 to 5 wt %, more preferably, from 0.01 to 1 wt %, and even more preferably, from 0.01 to 0.5 wt %, based on the total amount of the electrolyte. At concentrations lower than 0.01 wt %, the reduced gas generation benefit is not significantly realized. Battery performance characteristics such as cycle life deteriorate when the compound is used in an amount exceeding 10 wt % due to formation of a thick conductive layer which reduces the reversibility of the battery.

The lithium salt is preferably selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are natural numbers), LiCl, LiI and combinations thereof.

The concentration of the lithium salt preferably ranges from 0.6 to 2.0 M. When the concentration of the lithium salt is less than 0.6 M, the electrolyte performance deteriorates due to its lack of ionic conductivity. When the concentration of the lithium salt is greater than 2.0 M, the lithium ion mobility deteriorates due to an increase of the electrolyte viscosity, and low temperature performance also deteriorates.

The lithium salt acts in a battery as a supply source of lithium ions, making the basic operation of a lithium secondary battery possible. The non-aqueous organic solvent provides a medium wherein ions capable of participating in the electrochemical reaction are mobilized.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include γ-butyrolactone (γ-BL), n-methyl acetate, n-ethyl acetate, n-propyl acetate, etc. Examples of ethers include dibutyl ether, etc. However, the non-aqueous organic solvent is not limited to the above solvents.

It is preferable to use a mixture of a chain carbonate and a cyclic carbonate. The cyclic carbonate and the chain carbonate are preferably mixed together in a volume ratio from 1:1 to 1:9. When the cyclic carbonate and the chain carbonate are mixed in a volume ratio from 1:1 to 1:9 and the mixture is used as an electrolyte, the electrolyte performance may be enhanced.

In addition, the electrolyte of the present invention may further include mixtures of the carbonate solvents and aromatic hydrocarbon solvents of Formula (1):

(a)

(1)

where $R_1$ is a halogen radical or a $C_1$ to $C_{10}$ alkyl, and n is an integer of 0 to 6.

Examples of aromatic hydrocarbon solvents include benzene, fluorobenzene, toluene, fluorotoluene, trifluorotoluene, chlorobenzene, nitrobenzene, and xylene.

The carbonate solvents and the aromatic hydrocarbon solvents are preferably mixed together in a volume ratio from 1:1 to 30:1. When a carbonate solvent and an aromatic hydrocarbon solvent are mixed with each other in the aforementioned volume ratio, and the mixture is used as an electrolyte, the electrolyte performance may be enhanced.

According to another embodiment of the present invention, the organic sulfone-based compound of the following formula (2) may be added to the electrolyte, along with the above additive compound:

(2)

where $R_2$ and $R_3$ are independently selected from the group consisting of primary, secondary, or tertiary alkyl groups, alkenyl groups, aryl groups, and cycloalkyl groups, and preferably a $C_1$ to $C_4$ alkyl, a $C_2$ to $C_4$ alkenyl, a $C_6$ to $C_{14}$ aryl, or a $C_3$ to $C_6$ cycloalkyl. Alternatively, $R_2$ and $R_3$ may be bound together to form a cyclic ring. More preferably, one of $R_2$ and $R_3$ is a halogen-substituted alkyl group, an alkenyl group, an aryl group, or a cycloalkyl group, and the other one of $R_2$ or $R_3$ is an alkenyl such as vinyl.

Specific examples of a sulfone-based compound preferably include vinyl sulfone, methylvinyl sulfone, ethylvinyl sulfone, phenylvinyl sulfone, chlorophenylvinyl sulfone, fluorophenylvinyl sulfone, tetramethylene sulfone, and butadiene sulfone, but they are not limited thereto.

The organic sulfone-based compound inhibits gas generation on the negative electrode at high temperature, and improves cycle life and capacity characteristics. A sulfone-based compound is added to a non-aqueous solvent in an amount from 0.01 to 5 wt %, and preferably from 0.01 to 1 wt % based on the total amount of the electrolyte.

The electrolyte for a lithium secondary battery of the present invention is stable at temperatures ranging from −20 to 60° C., thus maintaining stable characteristics of the battery even at a voltage of 4 V. The electrolyte of the present invention may be applied to all lithium secondary batteries such as lithium ion batteries, lithium polymer batteries, and the like.

The lithium battery of the present invention uses a material that reversibly intercalates/deintercalates the lithium ions (lithiated intercalation compound) as a positive active material. Examples of positive active materials include lithium-containing metal oxides or a lithium-containing chalcogenide compounds such as $LiCoO_2$, $LiNiO_2$, $LiMnO_2$, $LiMn_2O_4$, and $LiNi_{1-x-y}Co_xM_yO_2$ where $0 \leq x \leq 1$, $0 \leq y \leq 1$, $0 \leq x+y \leq 1$, and M is a metal such as Al, Sr, Mg, La, or the like.

As the negative active material, the lithium secondary battery of the present invention uses a lithium metal, a lithium-containing alloy, a material that reversibly intercalates/deintercalates the lithium ions, or a material that reversibly forms a lithium-containing compound. Examples of materials that reversibly intercalate/deintercalate the lithium ions include crystalline and amorphous carbon and carbon complexes.

A lithium secondary battery is fabricated by the following process. Positive and negative electrodes are fabricated by coating a slurry, including active materials, on a current collector of an appropriate thickness and length. An electrode assembly is prepared by winding or laminating a positive electrode, a negative electrode, and a separator interposed between the positive and negative electrodes, then placing the electrode assembly into a battery case. An electrolyte of the present invention is injected into the case, and the upper part of the battery case is sealed. The separator interposed between the positive and negative electrodes may be a polyethylene, polypropylene, or polyvinylidene fluoride mono-layered separator; a polyethylene/polypropylene double layered separator; a polyethylene/polypropylene/polyethylene three layered separator; or a polypropylene/polyethylene/polypropylene three layered separator.

The present invention is further explained in more detail with reference to the following examples. The examples, however, should not in any sense be interpreted as limiting the scope of the present invention.

EXAMPLES AND COMPARATIVE EXAMPLES

Examples 1-7

Ethylene carbonate and ethylmethyl carbonate (EC/EMC) were mixed in a volume ratio of 1:1 to prepare a non-aqueous organic solvent. To prepare electrolytes, 1 M $LiPF_6$ was added to the solvent, and the additive compounds noted in Table 1 were further added in the amount indicated in Table 2 wherein the weight % of additive was based on the total weight of electrolyte.

TABLE 1

| Electrolyte | Additive compounds | Amount of additive compounds (wt %) |
| --- | --- | --- |
| Example 1 | Bisphenol A | 0.25 |
| Example 2 | Bisphenol A | 0.5 |
| Example 3 | Bisphenol A | 0.75 |
| Example 4 | Bisphenol A | 1.0 |
| Example 5 | Bisphenol A | 2.0 |
| Example 6 | 2,5-dimethylfuran | 1.0 |
| Example 7 | 2,3-dichloro-1,4-naphthoquinone | 1.0 |

Comparative Example 1

1 M $LiPF_6$ was added to a non-aqueous organic solvent of ethylene carbonate and ethylmethyl carbonate (EC/EMC) mixed in a volume ratio of 1:1 to prepare a non-aqueous electrolyte.

Measurement of Decomposition-initiating Voltage

Figure 2:
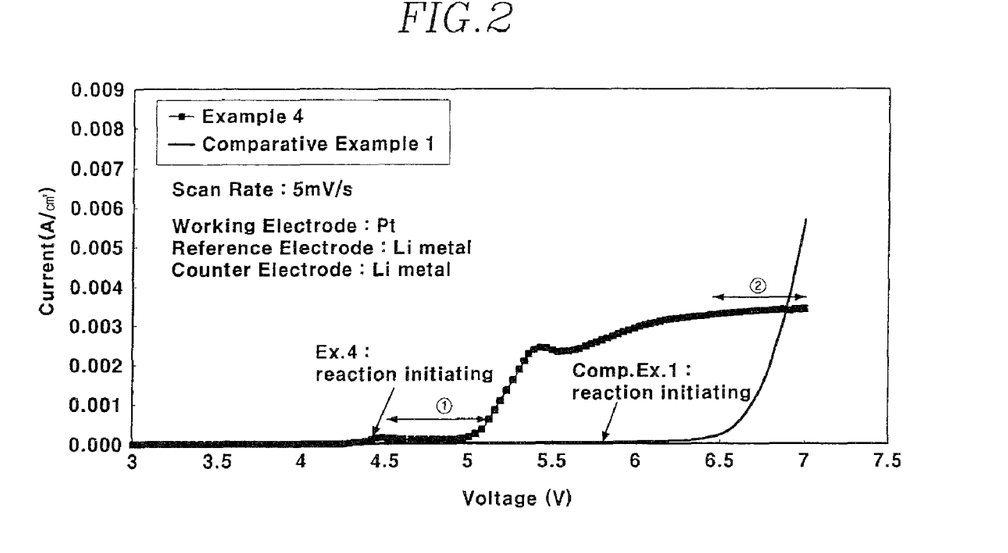
FIG. 2 is a graph illustrating measurement results of decomposition initiation voltage using LSV (linear sweep voltammetry) with respect to electrolytes of Example 4 of the present invention, and Comparative Example 1.
Figure 3:
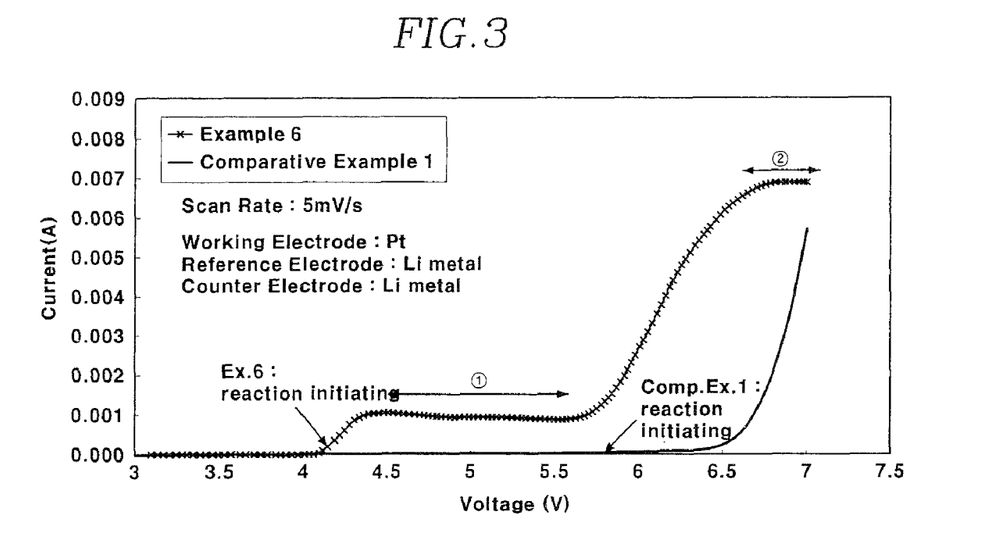
FIG. 3 is a graph illustrating measurement results of decomposition initiation voltage using LSV with respect to electrolytes of Example 6 of the present invention, and Comparative Example 1.

The decomposition-initiating voltage of each of the electrolytes according to Examples 4 and 6, and Comparative Example 1, was measured by LSV (linear sweep voltammetry). The measurement results of decomposition-initiating voltages of Example 4 and Comparative Example 1, and Example 6 and Comparative Example 1, are represented in FIGS. 2 and 3, respectively. As shown in FIG. 2, Example 4 shows a first constant current maintenance plateau region (① region) at a voltage range of 4.5 to 5V, and a second constant current maintenance plateau region (② region) at a voltage range of 6.5 to 7V. As shown in FIG. 3, Example 6 shows a first constant current maintenance plateau region (① region) at a voltage range of 4.5 to 5.5V, and a second constant current maintenance plateau region (② region) at a voltage range of 6.5 to 7V. The first constant current maintenance plateau region (① region) is due to the formation of a passivation layer on the electrode, and the second constant current maintenance plateau region (② region) which represses the decomposition of the non-aqueous solvent and improves safety at overcharge.

The decomposition-initiating voltages of the electrolytes according to Examples 4, 6, and 7, and Comparative Example 1 which were measured by LSV (linear sweep voltammetry) are represented in Table 2.

TABLE 2

| Electrolyte | Additive compounds | Decomposition-initiating voltage (V) |
|---|---|---|
| Example 4 | Bisphenol A | 4.4 |
| Example 6 | 2,5-dimethylfuran | 4.1 |
| Example 7 | 2,3-dichloro-1,4-naphthoquinone | 5.0 |
| Comparative Example 1 | — | 5.7 |

The conditions for measurement of the decomposition-initiating voltages were as follows:

working electrode: Pt; reference electrode: Li-metal; counter electrode:

Li-metal; voltage range: 3 V to 7 V; scan rate: 5 mV/s.

As shown in Table 2, the electrolytes of the Examples 4, 6, and 7 have a decomposition-initiating voltage of 4.4V, 4.1V, and 5.0V, respectively, which are lower than the decomposition-initiating voltage, 5.7V, of the electrolyte of Comparative Example 1. Accordingly, the electrolytes of the Examples decompose earlier during storage at high temperature after overcharging or full charging, and a conductive polymer layer is formed on the positive electrode at the above decomposition-initiating voltage. The conductive polymer layer prevents decomposition of carbonate-based organic solvent, thereby preventing the corresponding generation of gases and reducing the internal pressure of the battery to prevent swelling of the battery and to improve safety of the battery during storage at high temperature after full charging.

Fabrication of Lithium Secondary Batteries

After LiCoO2 (as a positive active material), polyvinylidenefluoride (PVdF) (as a binder), and acetylene black (as a conductive agent) were mixed in a weight ratio of 92:4:4, a positive active material slurry was prepared by dispersing the mixture into N-methyl-2-pyrrolidone (NMP). The slurry was coated on a 20 μm thick aluminum foil, dried, and compressed, thus manufacturing a positive electrode. After mixing crystalline artificial graphite as a negative active material with PVdF as a binder in a weight ratio of 92:8, a negative active material slurry was prepared by dispersing the mixture in NMP. The slurry was coated on a 15 μm thick copper foil, dried, and compressed, thus manufacturing a negative electrode. Together with a 25 μm thick polyethylene separator, the manufactured electrodes were wound and pressed, then placed into prismatic cans having the dimensions of 30 mm×48 mm×6 mm. The electrolytes of Examples 1-7 and Comparative Example 1 were injected into the cans, thus completing the fabrication of the prismatic lithium ion battery cell.

Thickness Increase Rate of Cells after Charging and Cycle Life Characteristics

The lithium battery cells fabricated by injecting electrolytes according to Examples 1-7 and Comparative Example 1 were charged with a current of 166 mA to a cut-off voltage of 4.2 V under constant current and constant voltage (CC-CV), allowed to sit for 1 hour, then discharged to a cut-off voltage of 2.75 V with a current of 166 mA, and allowed to sit for 1 hour. After 3 charge/discharge cycles were performed, the battery cells were fully charged with a current of 415 mA to a cut-off charge voltage of 4.2 V, over 3 hours. They were placed in a chamber at a high temperature (85° C.) for 4 days. The thickness of each cell after charging was measured every 24 hours to find the increase rates of the thickness of the cells relative to the thickness measured after cell fabrication.

Figure 4:
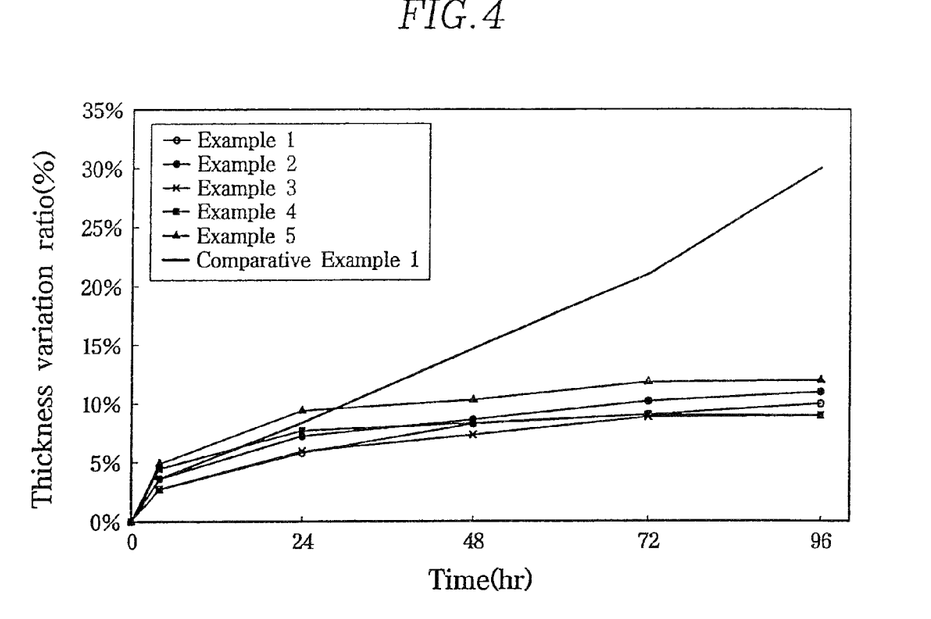
FIG. 4 is a graph illustrating thickness variation measured every 24 hours after batteries comprising electrolytes of Examples 1-5 and Comparative Example 1 were placed in a chamber at 85° C. for four days.
Figure 5:
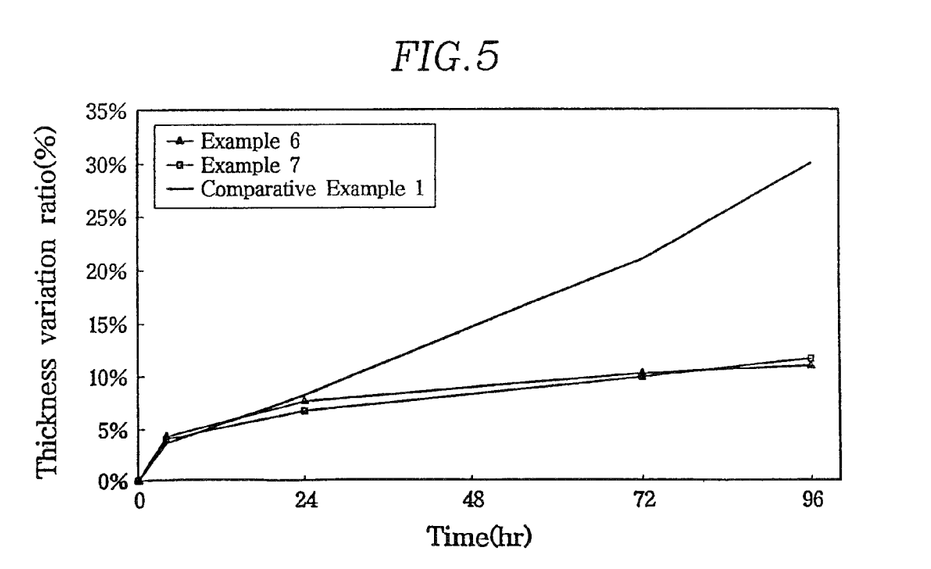
FIG. 5 is a graph illustrating thickness variation measured every 24 hours after batteries comprising electrolytes of Examples 6 and 7 and Comparative Example 1 were placed in a chamber at 85° C. for four days.

The measurement results of Examples 1 to 5 and Comparative Example 1 are shown in FIG. 4. in order to evaluate the variation in thickness according to the amount of additive compound, bisphenol A. The results of Examples 6 and 7 are represented in FIG. 5 in order to evaluate variation in thickness according to the kind of additive compound. For easy comparison, the result of Comparative Example 1 is also represented. As shown in FIG. 4, the increases in thickness of the lithium ion cells into which the electrolytes of Examples 1 to 5 were injected were substantially less than the thickness of the lithium ion cell into which the electrolyte of Comparative Example 1 was injected. As shown in FIG. 5, the increases in thickness of the lithium ion cells into which the electrolytes of Examples 6 and 7 were injected were also substantially less than the thickness of the lithium ion cell into which the electrolyte of Comparative Example 1 was injected. The increase rates of the thickness of the cells (relative to the thickness measured after cell fabrication) after being placed in a chamber at 85° C. for 96 hours (4 days) are represented in Table 3.

The lithium ion battery cells, which were manufactured with the electrolyte of Examples 1 to 7 and Comparative Example 1, were charged at 1 C to a cut-off voltage of 4.2 V under CC-CV, and the cells were discharged at 1 C to a cut-off voltage of 3.0 V under CC at 1 C. 300 cycles of charge and discharge of the cells were performed, and the cycle life characteristics (capacity retention) of the cells were measured. The results pertaining to Examples 1 to 7 and Comparative Example 1 are shown in Table 3. The capacity retention data of Table 3 are average values for 10 test cells.

TABLE 3

| | Thickness increase after allowing the cells to stand for 4 days at 85° C. | Capacity retention after 100 cycles | Capacity retention after 300 cycles |
|---|---|---|---|
| Example 1 | 10% | 97% | 90% |
| Example 2 | 11% | 96% | 89% |
| Example 3 | 9% | 95% | 88% |
| Example 4 | 9% | 93% | 87% |
| Example 5 | 12% | 91% | 85% |
| Example 6 | 10% | 94% | 88% |
| Example 7 | 12% | 93% | 87% |
| Comparative Example 1 | 30% | 90% | 80% |

As shown in Table 3, during storage at high temperature, the increases in thickness of the lithium ion cells into which the electrolytes of Examples 1 to 7 were injected were substantially less than the thickness increase of the lithium ion cell into which the electrolyte of Comparative Example 1 was injected. Table 3 shows that the capacity retentions after 100 and 300 cycles of the cells including electrolytes of Examples 1 to 7 were much better than the capacity retention of Comparative Example 1, indicating that the cells including electrolytes of Examples 1 to 7 have improved cycle life characteristics.

Figure 6:
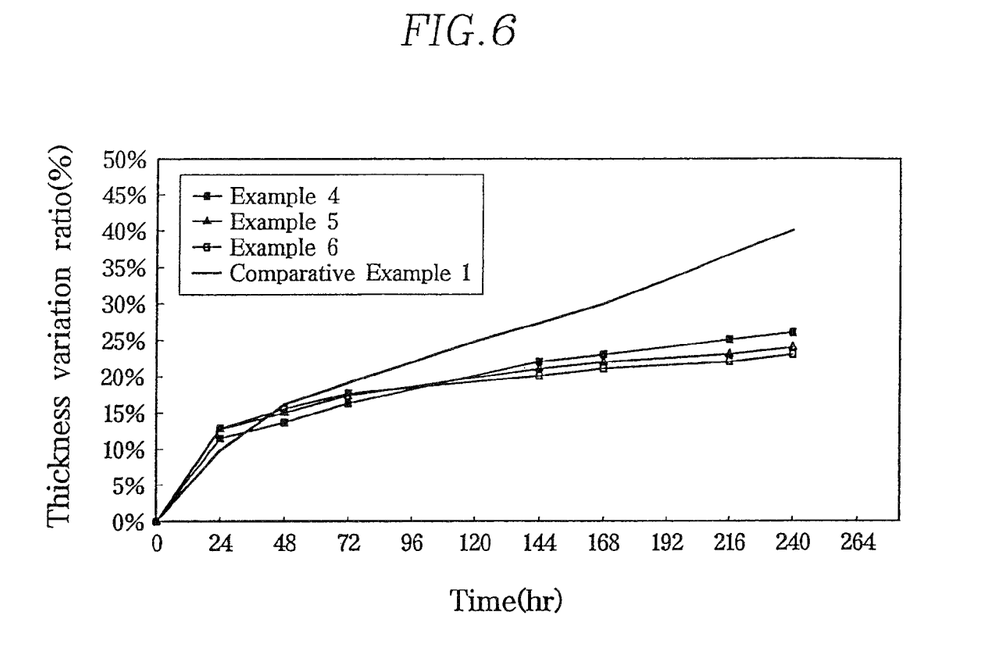
FIG. 6 is a graph illustrating thickness variation measured every 24 hours after batteries comprising electrolytes of Examples 4, 6, and 7 and Comparative Example 1 were placed in a chamber at 80° C. for ten days.

FIG. 6 shows the variation in thickness of the lithium ion cells into which the electrolytes of Examples 4, 6, and 7, and Comparative Example 1 were injected, after being placed in a chamber at a high temperature (80° C.) for 10 days. As shown in FIG. 6, the cells including electrolytes of Example 4, 6, and 7 had a significantly lower thickness increase rate than that of Comparative Example 1, even after being placed at a high temperature for long periods of time.

Figure 7:
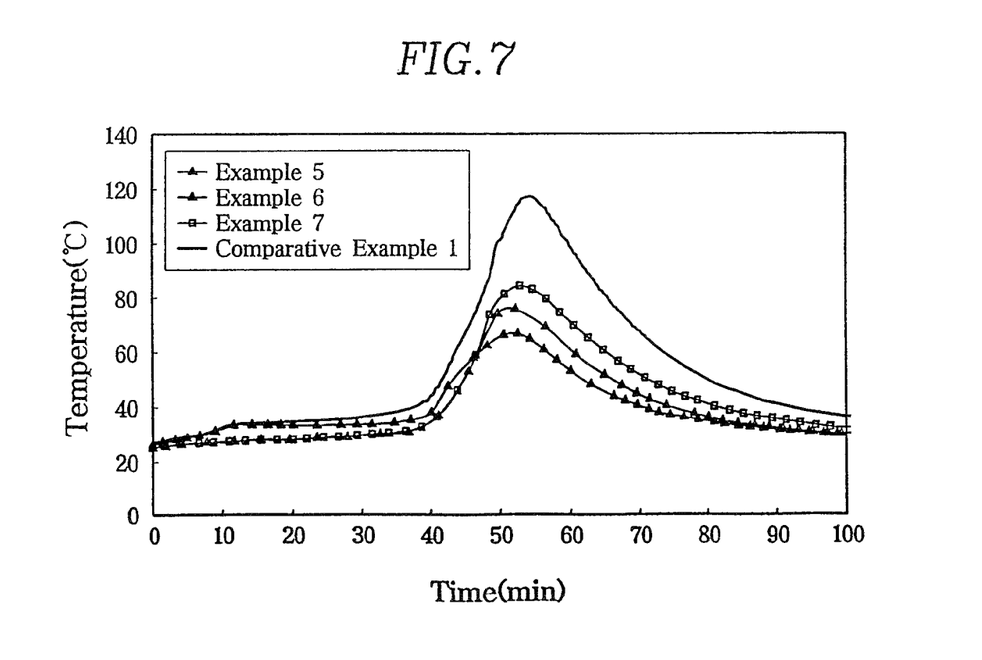
FIG. 7 is a graph illustrating cell temperature of batteries according to Examples 5, 6, and 7 of the present invention and Comparative Example 1 when the batteries were overcharged at 1C to a voltage of 12 V for 2 hours.

FIG. 7 shows the surface temperatures of lithium ion cells including electrolytes of Example 5 to 7, and Comparative Example 1, when overcharging the cells at 1 C at the voltage of 12 V for 2 hours. As shown in FIG. 7, the cells of Examples 5 to 7 had a negligible increase in temperature after about 40 minutes had lapsed after charging. Exothermic heat was reduced by adding the additive compounds to electrolyte. Accordingly, the additive compounds act as inhibitors of thermal runaway during overcharge, resulting in improved safety. To the contrary, the cell of Comparative Example 1 showed an abrupt increase of temperature to 120° C. or higher after 40 minutes had lapsed.

10 test cells including the electrolytes of Examples 2 to 7 and Comparative Example 1 were evaluated with respect to safety during heat exposure. Each cell was exposed to heat of 150° C. for 1 hour, and the status of each cell was evaluated. The results are shown in Table 4.

TABLE 4

|  | Safety at heat exposure* |
| --- | --- |
| Example 2 | 9L0, 1L1 |
| Example 3 | 10L0 |
| Example 4 | 10L0 |
| Example 5 | 10L0 |
| Example 6 | 9L0, 1L1 |
| Example 7 | 8L0, 2L1 |
| Comparative Example 1 | 5L4, 5L5 | note)
*The number preceding "L" indicates the number of tested cells. The results of the heat exposure test were rated as follows: L0: good, L1: leakage, L2: flash, L2: flame, L3: smoke, L4: ignition, L5: explosion.

As shown in Table 4 and FIG. 7, the cells of the Examples 2 to 7 have much better safety characteristics, for example when being subjected to overcharge and heat exposure, as well as having more desirable storage characteristics at high temperature and cycle life than the storage characteristics and cycle life of the cell of Comparative Example 1.

The additive compounds added to the electrolyte of the present invention decompose earlier than an organic solvent alone to form a conductive polymer layer on the surface of a positive electrode, and prevent decomposition of the organic solvent. Accordingly, the electrolyte of the present invention inhibits gas generation caused by decomposition of the organic solvent at initial charging or overcharge, and thus reduces an increase of internal pressure and swelling during high temperature storage, and improves storage characteristics at high temperature, cycle life characteristics and safety of the battery during overcharge.

The foregoing is considered illustrative only of the principles of the invention. Further, since numerous modifications and changes will readily occur to those skilled in the art, the invention is not limited to the exact construction and operation shown and described. Accordingly, all suitable modifications and equivalents may be utilized that fall within the scope of the invention and the appended claims.

Although a few embodiments of the present invention have been shown and described, it would be appreciated by those skilled in the art that changes may be made to these embodiments without departing from the principles and spirit of the invention, the scope of which is defined in the claims, and their equivalents.

What is claimed is:

1. A lithium secondary battery comprising:
    a positive electrode including a material that reversibly intercalates/deintercalates lithium ions;
    a negative electrode comprising a material selected from the group consisting of lithium metal, a lithium-containing alloy, a material that reversibly forms a lithium-containing compound, a material that reversibly intercalates/deintercalates lithium ions, and combinations thereof; and
    a non-aqueous electrolyte comprising:
        a lithium salt;
        an organic solvent; and
        an additive compound selected from the group consisting of bisphenol A, 2,3-dichloro-1,4-naphthoquinone, and combinations thereof that initiates decomposition at from 4V to 5V and shows a constant current maintenance plateau region of at least 0.5V at measurement of LSV (linear sweep voltammetry), wherein the additive compound is provided in an amount from 0.01 to 10 wt% based on the total weight of the electrolyte.

2. The lithium secondary battery according to claim 1, wherein the positive electrode is selected from the group consisting of a lithium-nickel-based oxide and a lithium-nickel-manganese-based oxide.

3. The lithium secondary battery according to claim 1, wherein the lithium secondary battery is a lithium ion battery or lithium polymer battery.

* * * * *